Oct. 11, 1949.                F. M. CAHEN ET AL              2,484,374
             APPARATUS FOR DETECTING BREAKS OF SYNCHRONISM
                         BETWEEN ELECTRIC MACHINES
Filed May 11, 1946                                         5 Sheets-Sheet 1

INVENTORS
FRANÇOIS MICHEL CAHEN
ANDRE CHEVALLIER
PIERRE MARIE ERNEST HENRIET

BY *Henry G. Rucke*
ATTORNEY

Oct. 11, 1949.

F. M. CAHEN ET AL

2,484,374

APPARATUS FOR DETECTING BREAKS OF SYNCHRONISM
BETWEEN ELECTRIC MACHINES

Filed May 11, 1946

INVENTORS
FRANCOIS MICHEL CAHEN
ANDRE CHEVALLIER
PIERRE MARIE ERNEST HENRIET

*Henry J. Lucke*
ATTORNEY

Oct. 11, 1949.                F. M. CAHEN ET AL                    2,484,374
              APPARATUS FOR DETECTING BREAKS OF SYNCHRONISM
                         BETWEEN ELECTRIC MACHINES
Filed May 11, 1946                                         5 Sheets-Sheet 3

INVENTORS
FRANCOIS MICHEL CAHEN
ANDRE CHEVALLIER
PIERRE MARIE ERNEST HENRIET
BY
ATTORNEY

Patented Oct. 11, 1949

2,484,374

UNITED STATES PATENT OFFICE 2,484,374

APPARATUS FOR DETECTING BREAKS OF SYNCHRONISM BETWEEN ELECTRIC MACHINES

François Michel Cahen, André Chevallier, and Pierre Marie Ernest Henriet, Paris, France, assignors to Union d'Electricité, Paris, France, a French society Application May 11, 1946, Serial No. 669,042
In France May 14, 1945

7 Claims. (Cl. 177—311)

1

The present invention relates to apparatus for detecting breaks of synchronism between synchronous machines connected to the same alternating current network, it being understood that the machines may belong either to the same central station or to different central stations interconnected together.

Its object is to provide apparatus of this kind capable of localizing, more accurately than up to now, the machines between which a loss of synchronism appears.

It consists, chiefly, in comparing at any time the relative angular positions of the rotors of the machines, by bringing into play auxiliary electromotive forces in relation with the operation of said machines (for instance supplied by auxiliary alternators driven by their rotors) and in causing the result of the comparison to appear on signalling apparatus, either luminous or not, arranged in such manner as clearly to bring into evidence the break of synchronism between machines.

Preferred embodiments of our invention will be hereinafter described with reference to the accompanying drawings, given merely by way of example and in which.

2

It is known that, in the present state of the art, in case of break of synchronism between the machines of a given network, the staff is warned by oscillations of the apparatus, such as ammeters, voltmeters, wattmeters, of the instrument boards and by the variations of luminous intensity of the lamps. On the contrary, they have no means of ascertaining between which machines or between which groups of machines the break of synchronism has taken place. At best can they roughly appreciate, in some cases, by observing the amplitude of the oscillations, whether the loss of synchronism concerns machines which are electrically close to the instrument board or which are separated from the instrument board by a high impedance.

Accurate and nearly instantaneous localizing of the groups of machines that are out of step would however be very valuable knowledge at the time of the perturbation because it would enable the staff to decide very quickly and with full knowledge of the causes upon the steps capable on the one hand of ensuring the protection of the running machines and on the other hand to safeguard the feed of current to the customers and then to ensure a quick return to normal service.

This is the object of the present invention, according to which, in order to detect and localize the break of synchronism between two machines whatever, we compare at any time magnitudes which represent the instantaneous state of synchronism of the various machines respectively.

According to our invention, we may compare the phases of electromotive forces generated in synchronism with the rotors of machines, for instance by means of auxiliary alternators mounted on these rotors, the lack of synchronism being brought into evidence by any suitable device, such as synchronoscope, differential voltmeters, coupling lamps, etc., or preferably signalling devices such as will be hereinafter described.

We may also measure the difference or sum of these electromotive forces and feed these differences or sums to relays sensitive to the variation of voltage that is applied thereto.

According to another embodiment, we compare the instantaneous frequencies of the electromotive forces of the machines or of the above-mentioned auxiliary alternators, for instance by bringing into play devices capable of generating, by means of a frequency, a direct current of an intensity proportional thereto, these devices being such as described in the French patent application filed by the society called: "Union d'Electricite" on Nov. 11, 1941, for "Device for transforming variations of frequency into proportional variations of direct current," in which case the break of synchronism is disclosed by differences of current which are utilized for energizing measurement apparatus or for bringing into play suitable signalling apparatus.

In a general manner, it will be of interest to make use of signalling apparatus such that they disclose at any time the synchronous or out of synchronism working of the machines, these apparatus including in particular instrument boards on which, in case of breaking of the synchronism, it is possible immediately to locate what are the machines that have kept synchronism and those that are out of step.

Figures 1, 2, 3, 4, 5, 6, 7:
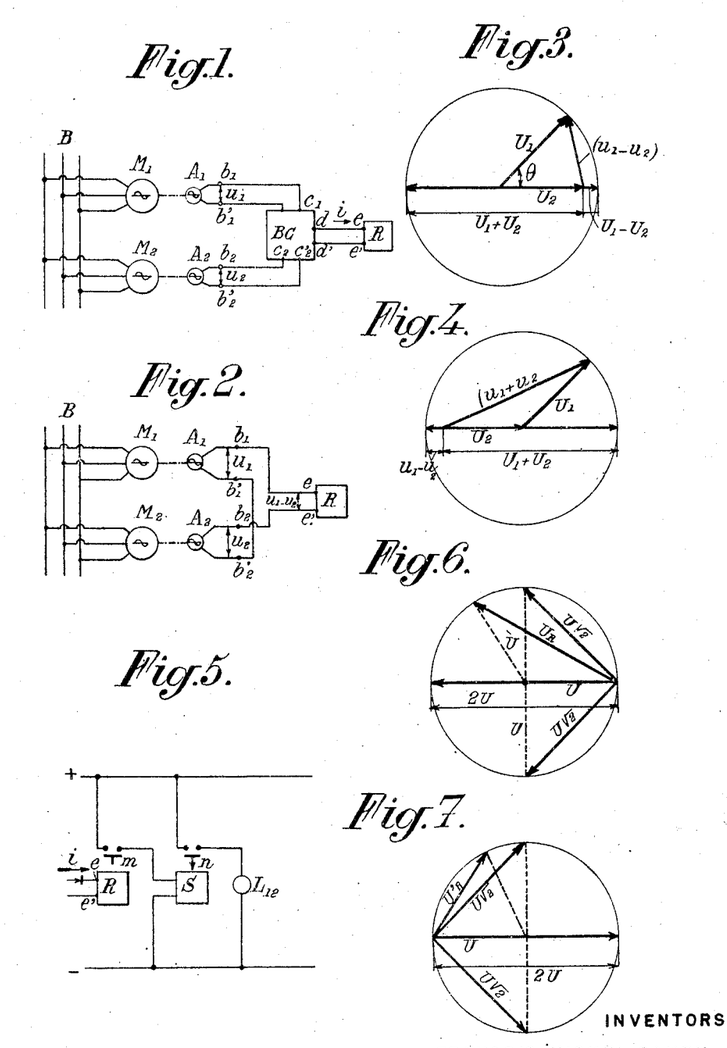
Figs. 1 and 2 diagrammatically show, according to two different embodiments respectively, the essential elements of a plant for checking the synchronism between two machines, according to our invention.
Figs. 3 and 4 show two diagrams of operation intended to illustrate certain features of the invention.
Fig. 5 is a diagram of some of the parts included in the apparatus according to the invention.
Figs. 6 and 7 are two other diagrams of operation.

In order to explain the principle of the invention, we have diagrammatically shown on Fig. 1, by way of example, two synchronous machines $M_1$, $M_2$ coupled in parallel with the same network B; to each of these machines is mechanically coupled, according to the invention, an auxiliary alternator diagrammatically illustrated at $A_1$, $A_2$; we may utilize for this purpose the auxiliary alternator with which certain machines are provided and which serves to the feed of certain parts or apparatus such as the tachometers of the turbine regulators; in this case it is preferable to provide for the auxiliary alternator a load that is substantially constant, or that represents a relatively small portion of its nominal power, so that its internal dephasing does not undergo important variations; we may also have the shaft of the synchronous machine driving a monophase alternator of simple construction and low power, for instance of the type of the homopolar alternators described in the patent application filed in France by the society called: "Union d'Electricite" on Jan. 23, 1945, for "Improvements brought to plants including alternating current rotary machines, in particular for energy transmission networks" in which case the voltage supplied by the homopolar alternator is simplified by means of a device of a known type, in such manner as to supply, at the output of this device, a voltage of suitable amplitude, of the same frequency and phase as the voltage of the homopolar alternator.

Whatever be the system that is adopted, we receive across terminals $b_1b'_1$ on the one hand, $b_2b'_2$ on the other hand, monophase voltages $u_1u_2$ respectively the comparison of which permits, by making use of one of the methods according to our invention as will be hereinafter described, of controlling whether auxiliary alternators $A_1A_2$ and consequently machines $M_1M_2$ with which the alternators $A_1A_2$ are directly coupled, are, or are not, in synchronism.

One of the means that can be utilized for this purpose, consists in comparing at any time the phase angles of voltages $u_1$, $u_2$; for if it is supposed first that machines $M_1$, $M_2$ work on no load and in synchronism with each other and that alternators $A_1A_2$ are also working on no load, it is always possible, by a suitable angular setting of the rotors or the stators of these alternators, to arrange that voltages $u_1$ and $u_2$ are in phase. If it is supposed now that machines $M_1$, $M_2$, still in synchronism, are under load, same as alternators $A_1$, $A_2$; voltages $u_1$, $u_2$ will cease to be in phase, the phase difference between them depending upon the difference between the active powers of machines $M_1$, $M_2$ on the one hand, $A_1$ and $A_2$ on the other hand; this dephasing may vary as a function of the load of the various machines, but its value always remains moderate and does not seem to be likely to exceed $$\pm \frac{\pi}{2}$$

If, now, machines $M_1$ and $M_2$ cease to be in synchronism, the dephasing between voltages $u_1$ and $u_2$ increases indefinitely, at a rate which is the greater as the instantaneous difference between the frequencies corresponding to the speeds of revolution of machines $M_1$ and $M_2$ is the higher. In order to bring into evidence this continuous increase of the dephasing, which characterizes the state of absence of synchronism, a first method would consist in feeding voltages $u_1$ and $u_2$ to the two units, respectively, of an apparatus known under the name of synchronoscope; under normal working conditions, this apparatus would give a deviation, if not constant, at least moderate, of its needle; in case of absence of synchronism, this needle would be given a movement of rotation, the faster as the difference between the frequencies of the two machines is greater. However, such apparatus have a relatively important current consumption; on the other hand, it is unnecessary permanently to have under one's eyes the indication of the instantaneous value of the dephasing, the problem being only to indicate, at any time, whether the two machines are, or are not, in synchronism.

One of the methods that may be utilized for this purpose, according to another feature of the invention, consists in connecting the terminals of the two auxiliary alternators to those of a device, diagrammatically shown on Fig. 1 at BC, which permits measurement of the dephasing between voltages $u_1$, $u_2$, by supplying across its terminals $dd'$ a current $i$ varying periodically as a function of the dephasing $\theta$ between these voltages; we may in particular make use for this purpose of one of the methods described in the patent application filed in France by the society called "Union d'Electricite," on Feb. 15, 1942, for "Improvements brought to methods of the kind of those used for the selective protection of electric energy transmission networks," on April 14, 1942, for "Improvements brought to methods and devices of the kind of those used for measuring or comparing sinusoidal functions, in particular with a view to actuating apparatus for the selective protection of distribution networks" and on September 10, 1943, for "Improvements brought to methods and devices for measuring and comparing periodic functions in particular for the selective protection of networks." Under normal working conditions, when both machines are in synchronism, the dephasing $\theta$ is constant, or, at least, undergoes but accidental fluctuations under the effect of the variations of load of the machines themselves and of their auxiliary alternators; it remains practically confined, as above stated, between limits of $$\pm \frac{\pi}{2}$$

If, as it can be obtained by means of the above mentioned methods, current $i$ is a periodic function of the phase difference $\theta$ such that, when the dephasing $\theta$ is equal to $$\pm \frac{\pi}{2}$$

$i$ is equal to zero, and when this dephasing is equal to zero or $\pi$, $i$ passes through maxima of equal absolute value and opposed signs, it is easy to understand that under normal working conditions current $i$ will keep a constant sign, its amplitude ranging from zero to its maximum value. On the contrary, in case of absence of synchronism between the machines, dephasing $\theta$ will increase in an uninterrupted manner, and current $i$ will oscillate between two maxima of opposed signs, with a period of oscillation equal to one half of the period of beat of the two voltages $u_1$, $u_2$. This oscillation, which is a characteristic of the loss of synchronism, can be brought into evidence by an apparatus diagrammatically shown at R for which various embodiments can be conceived, and in particular those that will be hereinafter described.

Another method which permits of bringing into evidence the continuous increase of dephasing $\theta$ consists in placing in opposition, as shown by Fig. 2, voltages $u_1$ and $u_2$, and in applying the difference $(u_1-u_2)$ across the terminals of the detecting apparatus diagrammatically shown at R, as if it were desired to feed a differential voltmeter. It is clear, as shown by the vectorial diagram of Fig. 3, that if voltages $u_1$ and $u_2$ respectively have virtual values $U_1$ and $U_2$, the virtual value of the voltage $(u_1-u_2)$ applied across the terminals of apparatus R will oscillate between $(U_1-U_2)$ and $(U_1+U_2)$ when dephasing $\theta$ increases in a continuous manner; in particular, if care is taken that $U_1=U_2=U$, the oscillation of voltage $(u_1-u_2)$ will take place between zero and $2U$; the period of this oscillation will be equal to the beat period of voltages $u_1$, $u_2$.

The same result can also be obtained by associating in series voltages $u_1$ and $u_2$ and by applying the sum $(u_1+u_2)$ to the terminals $e$, $e'$ of apparatus R. As shown by the vectorial diagram of Fig. 4, the virtual value of voltage $(u_1+u_2)$ will oscillate between $(U_1-U_2)$ and $(U_1+U_2)$. However, contrary to what takes place in the preceding case, this amplitude will be maximum for the periods of concordance of voltages $u_1$ and $u_2$ and minimum for the periods of opposition. If the conditions $U_1=U_2=U$ is complied with, the virtual value of voltage $u_1+u_2$) will be equal to $2U$ for the periods of concordance and will be zero for the periods of opposition.

Various embodiments can be designed for the construction of the apparatus, diagrammatically shown at R in Figs. 1 and 2, which are intended to bring into evidence the synchronous or out of synchronism state of the two machines.

One of these systems consists, according to another feature of the invention, in feeding with current $i$, in the case of the arrangement of Fig. 1, or with voltage $(u_1-u_2)$ or $(u_1+u_2)$ in the case of Fig. 2, the excitation winding of a relay of a known type, for instance an electromagnetic relay of such low inertia that the movements of its movable armature follow the variations of current passing through its winding. Thus, in case of loss of synchronism between the two machines the relay contact will open and close alternately, at the frequency of the beats between voltages $u_1$ and $u_2$ and the movement of this contact will be utilized for the feed of a luminous signalling device which will be hereinafter described.

Fig. 5 diagrammatically shows one of the embodiments that may be used for this purpose when the arrangement of Fig. 1 is chosen. Relay R is fed with current $i$ through a rectifier device so that its contact $m$ is open when current $i$ is in a direction corresponding to a dephasing between voltages $u_1$, $u_2$ that ranges from $$-\frac{\pi}{2} \text{ to } +\frac{\pi}{2}$$

and that this contact is closed when current $i$ is in a direction corresponding to a dephasing of a value ranging from $$-\frac{\pi}{2} \text{ to } -\pi$$

or from $$+\frac{\pi}{2} \text{ to } \pi$$

Contact $m$ is in series with the coil of a relay, diagrammatically shown at S, fed from a direct current source of energy, diagrammatically shown by the bars of $+$ and $-$ polarity, this relay S being made in such manner, according to a known method, that contact $n$ closes instantaneously, when relay S is excited, therefore when contact $m$ closes and opens only after a certain time $t$ of adjustable value. Contact $n$ is itself connected in series with a signalling lamp $L_{12}$. The operation of this device is as follows:

As long as the machines are in synchronism, current $i$ keeps a constant direction corresponding to the opening of the contact $m$ of relay R, relay S is not energized, its contact $n$ remains open and lamp $L_{12}$ is off.

In case of loss of synchronism, current $i$ oscillates while changing direction as above stated, whereby relay R alternately closes and opens its contact $m$ on every beat period of voltages $u_1$, $u_2$. Every time contact $m$ closes, relay S is energized and in turn closes its contact $n$ producing the switching on of lamp $L_{12}$. When contact $m$ opens, relay S is deenergized, but its contact $n$ opens only after a short time $t$. By suitably adjusting this time, it is possible to manage so that contact $n$ remains closed as long as the beat frequency of voltages $u_1$, $u_2$ does not drop below a given value: let us designate by T the beat period of voltages $u_1$, $u_2$; the contact $m$ of relay R will be closed for a time equal to less than one half of this period, which time can be represented by $$\frac{kT}{2}$$

$k$ being a coefficient smaller than 1. The time that elapses between the opening of contact $m$ and its next closing is:

$$T - k\frac{T}{2} = T\left(1 - \frac{k}{2}\right)$$

in order to obtain that contact $n$ remains closed during this time, in the course of which relay S ceases to be energized, the delay to opening of this relay must be at least equal to this time, which gives the relation:

$$t > T\left(1 - \frac{k}{2}\right)$$

By suitably choosing the value of $t$, it is therefore possible to adjust the beat period $T$ below which signal lamp $L_{12}$ remains constantly switched on.

Thus, in normal working conditions, lamp $L_{12}$ will be off; when the machines begin to drop out of synchronism, i. e. when the frequencies of voltages $u_1$, $u_2$ are still very close to each other, lamp $L_{12}$ is alternately switched on and off; then as the lack of synchronism increases, this lamp remains switched on, warning the staff that a break of synchronism has occurred between the machines; in case of tendency to spontaneous return to synchronism, the frequencies of tensions $u_1$, $u_2$ coming back to values very close to each other, the beat period will increase until lamp $L_{12}$ starts flickering, to be finally switched off when synchronism is again obtained.

It is clear that instead of providing a signal lamp, we may feed through contact $n$ a delayed action relay opening, after the desired time, the switches of both machines or the switch of one of them.

We might also control through relay $R$ a rotary switch coacting with a multiplicity of lamps analogous to those described with reference to Fig. 19, these lamps being switched on, in case of break of synchronism, at a rate which is the more rapid as the break of synchronism is more important.

Instead of the arrangement diagrammatically shown by Fig. 5, making use of relays $R$ and $S$ the contacts of which are open in the absence of excitation of their windings, we might as well utilize relays the contacts of which would be closed in the absence of excitation of their windings. Thus, under normal working conditions, contact $m$ would be closed, relay $S$ excited and its contact $n$ open, this contact being, as in the preceding case, of the instantaneous closure and delayed opening type.

Analogous devices may be employed if use is made of the arrangement of Fig. 2, in which a voltage $(u_1-u_2)$ or $(u_1+u_2)$ is applied across the terminals of the indicator system.

Thus the device diagrammatically shown by Fig. 5 applies to the case in which we make use of voltage $(u_1-u_2)$ which it suffices to apply across the terminals $e$, $e'$ of relay $R$; however this relay must be conceived in such manner that it closes its contact $m$ only if the voltage applied across its terminals is higher than a given value $U_R$, so that the system remains uninfluenced by the dephasing $\theta$ which may exist under normal working conditions, as above stated, between voltages $u_1$ and $u_2$. Let us suppose, as it is likely, that this dephasing $\theta$ remains inside limits $$-\frac{\pi}{2} \text{ and } +\frac{\pi}{2}$$

The vectorial diagram of Fig. 6, based, for the sake of simplicity, upon the assumption that the amplitudes of voltages $u_1$, $u_2$ are equal to one another, shows that the maximum virtual value of voltage $(u_1-u_2)$ under normal working conditions is equal to $U\sqrt{2}$. In case of absence of synchronism, as this virtual value oscillates between $0$ and $2U$, it will be necessary for relay $R$ to close its contact for a virtual value of the voltage across its terminals ranging from $U\sqrt{2}=1.4U$ and $2U$.

The diagram of Fig. 5 pertains to the arrangement in which there is applied, across the terminals of relay $R$, a voltage $(u_1+u_2)$. However, relay $R$ is then fed under normal working conditions by a voltage of a virtual value ranging from $U\sqrt{2}$ to $2U$ as shown by the vectorial diagram of Fig. 7; it must therefore be arranged so that its contact $m$ is open when the voltage that is applied is higher than a given value $U'_R$ lower than $U\sqrt{2}$ and will close only when the voltage that is applied becomes lower than $U'_R$.

If now, instead of comparing the phases of voltages $u_1$, $u_2$, it is desired to compare their instantaneous frequencies, we feed, for instance, each of these voltages $u_1$, $u_2$ to a device which transforms the variations of their frequencies into proportional variations of direct current, in particular in accordance with the above mentioned prior French patent application, of Nov. 23, 1941.

Figure 8:
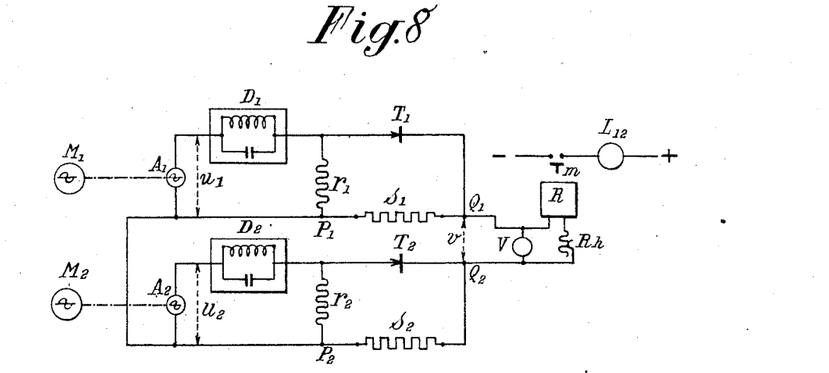
Fig. 8 is a diagram of an apparatus for detecting breaks of synchronism, according to another embodiment of the invention.

Fig. 8 diagrammatically shows an embodiment which can be used for this purpose. In this case, each of the auxiliary alternators $A_1$, $A_2$ feeds a circuit including, according to the features of said application, a bipolar system $D_1$, $D_2$, the impedance of which is a hyperbolic function of the frequency, and a fixed resistance $r_1$, $r_2$; across the terminals of this resistance is inserted a linear rectifier $T_1$, $T_2$ in series with a resistance $s_1$, $s_2$; the difference of potential across the terminals of resistance $s_1$ is then a linear function of the frequency $f_1$ of alternator $A_1$ and can be put under the form:

$$v_1=U_1(A_1+B_1f_1)$$

Likewise the difference of potential $s_2$ is a linear function of the frequency $f_2$ of alternator $A_2$, of the following form:

$$v_2=U_2(A_2+B_2f_2)$$

If things are arranged in such manner that voltages $U_1$, $U_2$ are equal, $U$ being their common value, and that the circuits fed by the two alternators are identical, which leads to equalities $A_1=A_2=A$, $B_1=B_2=B$ we have:

$$v_1=U(A+Bf_1)$$
$$v_2=U(A+Bf_2)$$

and therefore:

$$v=v_1-v_2=BU(f_1-f_2)$$

By connecting, according to the diagram of Fig. 8, the terminals $P_1$, $P_2$ of the two circuits together, we receive across terminals $Q_1$, $Q_2$ a direct voltage $v$ proportional to the difference between the instantaneous frequencies of the two alternators.

When the two machines to be compared $M_1$, $M_2$ are in synchronism, the frequencies $f_1$, $f_2$ of the voltages across the terminals of auxiliary alternators $A_1$, $A_2$ are identical and the voltage $v$ across terminals $Q_1$, $Q_2$ is zero.

In case of absence of synchronism between the two machines, frequencies $f_1$, $f_2$ become different from each other and voltage $v$ assumes a value different from zero, the higher as the difference between the above frequencies is greater, of positive or negative direction according as $f_1$ is higher or lower than $f_2$.

It is possible to arrange several devices for bringing about the state of synchronism or out of synchronism of the two machines by means of this voltage $v$. One of them, diagrammatically shown by Fig. 8, consists in feeding with voltage $v$ a relay $R$, of a known type, the contact $m$ of which, upon closing, feds current to a signal lamp $L_{12}$. The operation of this device is then the following:

As long as the machines are in synchronism, voltage $v$ is zero, relay $R$ is not energized and lamp $L_{12}$ is out. In case of loss of synchronism, a voltage $v$ appears across the terminals of the relay and causes the closing of its contact $m$ and the switching on of lamp $L_{12}$. By suitably adjusting the starting voltage of relay R, for instance by means of a rheostat Rh in series with its winding, it is possible to arrange so that lamp $L_{12}$ is switched on only when the difference between the frequencies of the two machines is higher than a given value.

Figure 9:
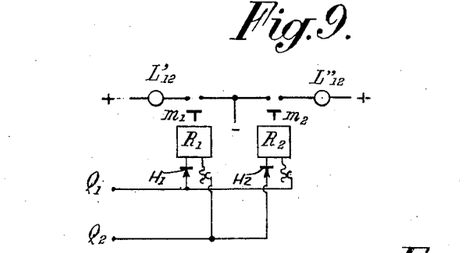
Fig. 9 shows a modification of the diagram of Fig. 8.

By inserting a double deviation voltmeter V across the terminals of the relay, it is further possible, according to the direction of its deviation, to observe which of the two machines $M_1$, $M_2$ has the higher frequency. Instead of making use of a voltmeter, it is also feasible, as shown by Fig. 9, to provide for this purpose a luminous signalling device, including two relays $R_1$, $R_2$ the windings of which are mounted in series with rectifiers $H_1$, $H_2$ and the contacts $m_1$, $m_2$ of which respectively serve to the feed of signal lamps $L'_{12}$ and $L''_{12}$.

The devices which have just been described are intended to disclose the status, either of synchronism or of lack of synchronism, of two machines, but they can be employed to the case of any number of machines, for instance all the alternators of a generating plant. One of the devices that are applicable in this case follows from the diagram of Fig. 5 and is diagrammatically represented by Figs. 10, 11, 12, 13, which correspond, by way of example, to the case of four machines.

Figure 10:
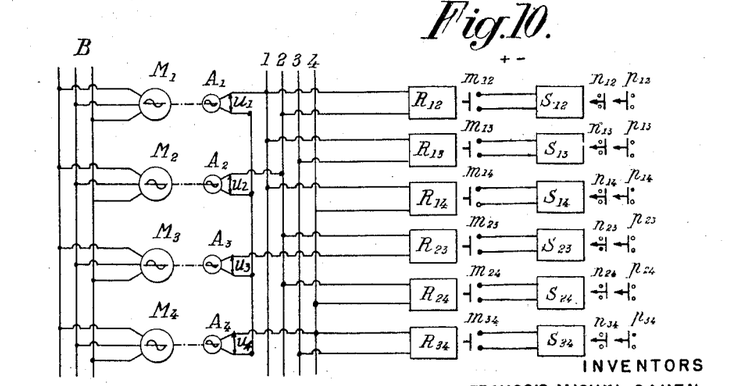
Fig. 10 diagrammatically shows another apparatus arranged according to the invention.

In Fig. 10, we have shown four synchronous machines $M_1$, $M_2$, $M_3$, $M_4$ connected to a common network B and to which are mechanically coupled four monophase auxiliary alternators $A_1$, $A_2$, $A_3$, $A_4$ producing voltages $u_1$, $u_2$, $u_3$, $u_4$; the phases of these voltages taken two by two are compared by making use for this purpose of one of the devices above described and diagrammatically shown by Figs. 1 and 2. On Fig. 10 which corresponds, for instance, to Fig. 2, we have diagrammatically shown the phase comparison relays at $R_{12}$, $R_{13}$, $R_{14}$, $R_{23}$, $R_{24}$, $R_{34}$. The indexes of the reference characters which designate these relays indicate between which alternators they are connected. Thus relay $R_{12}$ is between alternators $A_1$ and $A_2$, relay $R_{23}$ between alternators $A_2$ and $A_3$, relay $R_{34}$ between alternators $A_3$ and $A_4$. The same applies to relays S. Each of these relays produces, by the closing of its contact $m$, the excitation of the corresponding intermediate relay S. Each relay is provided with two contacts, to wit, one $n$, normally closed, of the instantaneous opening and delayed closing type, the other $p$, normally open, of the instantaneous closing and delayed opening type. The delay period, which is of the same value for the closing of relay contact $n$ and the opening of relay contact $p$ must preferably be adjustable, so as to permit adjusting, as above indicated, the period (or the frequency) of the beats between two machines below which the device for signalling losses of synchronism is not operated.

Figures 11, 14:
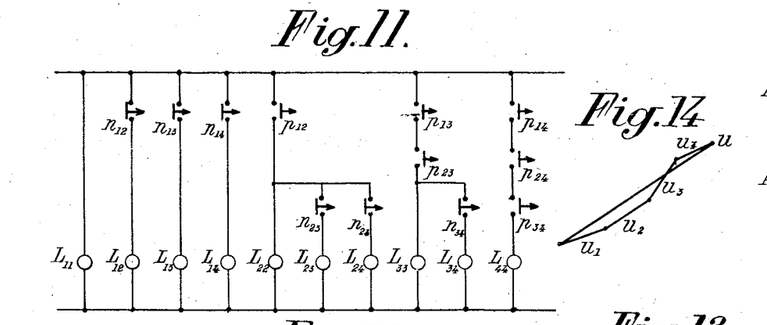
Fig. 11 is a diagram, derived from that of Fig. 5, for showing by means of signal lamps the state of synchronism of four machines.
Fig. 14 is vectorial diagram illustrating one of the features of the invention.
Figure 12:
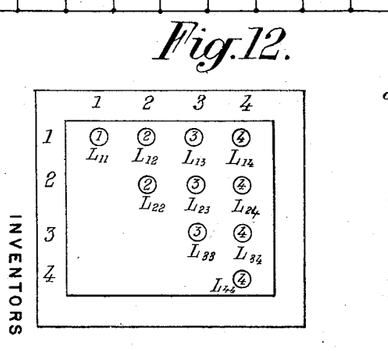
Fig. 12 diagrammatically shows a luminous board the lamps of which are controlled by the apparatus of Fig. 11.
Figure 13:
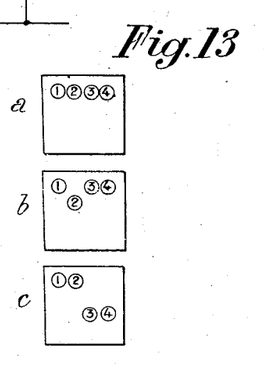
Fig. 13 shows three different aspects this board can assume.

In Fig. 11, which follows the arrangement of Fig. 5, we have diagrammatically shown, by way of example, a luminous signalling device capable of indicating at any time the state of synchronism or out of synchronism of the four machines. We have shown on this figure the contacts $n_{12}$, $p_{12}$, $n_{13}$, $p_{13}$ ... of the six relays $S_{12}$, $S_{13}$ .... These contacts are associated with luminous signalization lamps $L_{11}$, $L_{12}$, $L_{13}$ ... the switching on or off of which makes it possible immediately to indicate the state of synchronism or lack of synchronism of the four machines; for this purpose, it is of interest to associate with these lamps a luminous board, according to the arrangement of Fig. 12, with four rows and four columns, the first row including four lamps $L_{11}$, $L_{12}$, $L_{13}$, $L_{14}$, the second one three lamps $L_{22}$, $L_{23}$, $L_{24}$, and so on. It is also advantageous to mark on the signal lamps or on the indicators they illuminate the numbers of the machines, as shown by Fig. 12. Under these conditions, the operation of the device will be as follows:

When the four machines are in synchronism, all the contacts $n$ are closed and all the contacts $p$ are open; examination of Fig. 11 shows that only lamps $L_{11}$, $L_{12}$, $L_{13}$, $L_{14}$ of the first horizontal row of the board are lit; the operator has under his eyes the luminous board represented by Fig. 13 (on Fig. 13abc only the lamps that are switched on are shown).

If, now, it is assumed that machines 1, 3, 4 remain in synchronism, but that machine 2 drops out of synchronism with respect to the three others, relay $S_{12}$ opens its contact $n$ and closes its contact $p$; Fig. 11 shows that lamp $L_{12}$ is switched off and lamp $L_{22}$ is switched on. At the same time, relays $S_{23}$ and $S_{24}$ open their contact $n$, which prevents the switching on of lamps $L_{23}$, $L_{24}$; on the other hand, the closing of their contact $p$ has no effect whatever, their contacts $P_{13}$ and $P_{14}$ remaining open. Finally, the luminous board has the aspect of Fig. 13.

If machines 1, 2 on the one hand, machines 3, 4 on the other hand remain in synchronism with respect to each other, the two groups of machines having dropped out of synchronism with respect to each other, Fig. 11 shows that the lamps that remain switched on are $L_{11}$, $L_{12}$, $L_{33}$, $L_{34}$, which leads to the aspect of the luminous board shown by Fig. 13c.

In a more general manner, the operator sees at any time, on the same horizontal line of the luminous board, the lamps that correspond to machines that have remained in synchronism with one another and, on different horizontal lines, the lamps that correspond to machines that are out of step.

It is clear that the preceding features, given by way of example in the case of four machines, extend to any number of machines, and that, on the other hand, other similar arrangements can be applied without departing from the principle of the invention.

The luminous signalling device which has just been described can also be utilized when, instead of comparing with one another the phases of the auxiliary alternators, their instantaneous frequencies are compared, as above indicated; in this case, the intermediate relays $S_{12}$, $S_{13}$ ... are unnecessary and it suffices to provide relays $R_{12}$, $R_{13}$ ..., which are directly fed by the comparison devices of Fig. 8, with two contacts, one $n$ which is normally closed, the other $p$ which is normally open; the working of these contacts can then be instantaneous in both directions since the adjustment of the frequency difference above which the signalling means are to work is effected in this case, as above stated, by acting upon the working voltage of relays R. The connections between contacts and signalling lamps are made as shown by Fig. 11 and the operation of the luminous board is that above described with reference to Fig. 8.

Another feature, applicable as well to the case in which the phases are compared, as to that in which the frequencies of the auxiliary alternators are compared, consists, in case of absence of the synchronism, in showing through a luminous display the lead or lag of a machine or group of machines with respect to the other machines or groups of machines.

Supposing that there are $n$ machines $M_1$, $M_2$ ... $M_n$ (Fig. 17) the auxiliary alternators of which supply voltages $u_1$, $u_2$ ... $u_n$ and a generator giving a voltage $u$, synchronized by a voltage U, proportional to the sum of the voltages, as it will be hereinafter indicated. This generator may be, for instance, a tube alternator or a small monophase alternator, driven by a synchronous motor fed with a voltage U. Each of the voltages $u_1$, $u_2$ ... $u_n$ is compared to voltages $u$, by means, for instance, of the devices of Figs. 1, 2 and 8.

Figure 17:
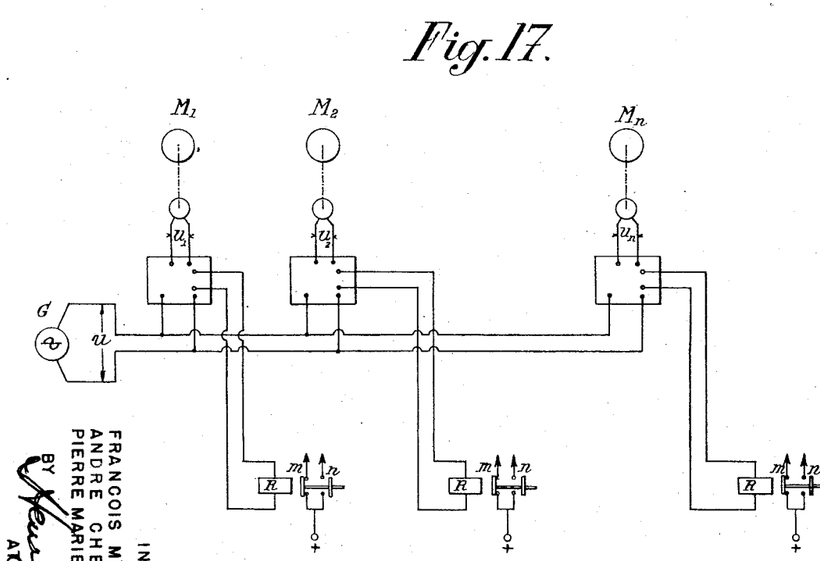
Fig. 17 shows an apparatus for detecting breaks of synchronism, according to another feature of the invention.

If the $n$ machines are in synchronism, the $n$ relays R remain at rest. If one of the machines loses synchronism with respect to the remainder, the relay R that corresponds to this machine opens its contact $m$ and closes its contact $n$ at the frequency of the beats.

Figure 18:
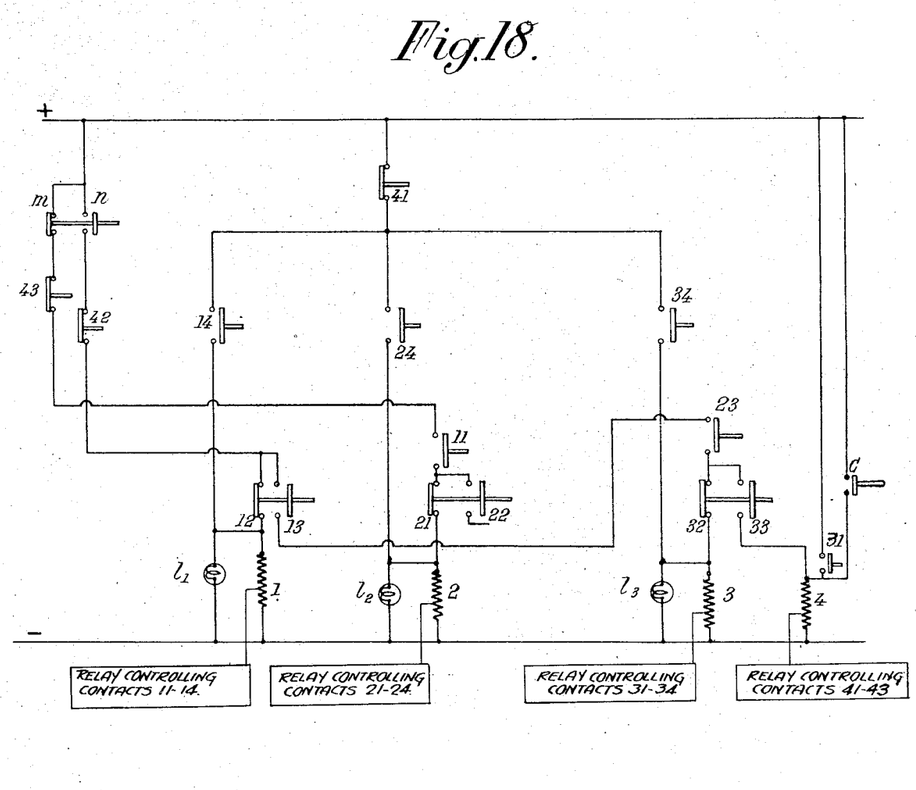
Fig. 18 shows relays to be combined with the apparatus of Fig. 17.

The contacts $m$ and $n$ of this relay control, as shown by Fig. 18, which relates to the machine that is considered, the working of lamps $l_1$, $l_2$, $l_3$, after one another, the preceding ones remaining switched on.

The operation of the device appears clearly from the diagram of this Fig. 18, in which we have shown only three lamps, it being well understood that the number of lamps can be as high as desired. Relay 1 controls contacts 11 to 14, relay 2 contacts 21 to 24, relay 3 contacts 31 to 34, relay 4 contacts 41 to 43. It will be seen that, when contacts is made at $n$, lamp $l_1$ is switched on through 42 and 12; immediately relay 1 is caused to work, keeps lamp $l_1$ switched on through 41 and 14 and closes contact 13 connected with lamp $l_3$. When contact is restored at $m$, on the next beat, lamp $l_2$ is switched on through 43, 11, 21; relay 2 is brought into action, keeps lamp $l_2$ switched on through 41, 24 and prepares contact 22 for lamp $l_4$ (if it exists). When $n$ again closes, lamp $l_3$ is switched on and so on. When the last lamp is switched on, for instance lamp $l_3$ on Fig. 18, a relay 4, having a slight delay to closing, is energized, opens contact 41, 42, 43 and subsequently switches off the three lamps. The cycle of operation can then be resumed. The faster the beats, the higher the rate of successive switching on of the lamps.

Figure 19:
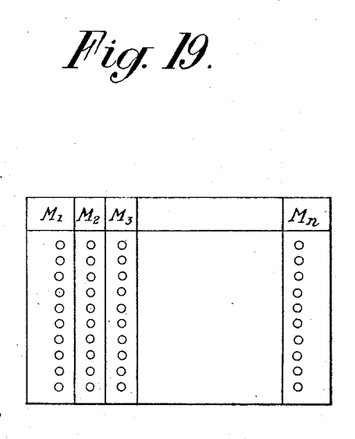
Fig. 19 is a luminous board to be controlled by the apparatus of Figs. 17 and 18.

In this arrangement, to each machine or group of machines can be given to correspond a series of lamps grouped into a board, as shown by Fig. 19. Each column of lamps which corresponds to the lamps $l_1$, $l_2$, $l_3$ ... $l_n$ of a diagram such as that of Fig. 18 is attributed to one machine.

If two or more machines or groups of machines lose synchronism, it is possible to follow, on the board, according to the rate of switching on of the lamps in each column, the rate at which the machine gets out of step or the possibility of synchronism being restored. In order to facilitate comparison, a hand contact C, acting simultaneously on the relay 4 of each series of lamps, makes it possible to reset all the lamps to the state of rest at the same time and thus more easily indicating the relative rates at which the machines get out of step.

The generator G of Fig. 17 should be synchronized, in normal working conditions, by means of a voltage U proportional to the sum of the voltages $u$, this in order to make it possible that the lamps are not switched on as long as synchronism is maintained. The number of voltages $u$ is equal to the number of machines or groups of machines. But it should then be noted that, if all the machines or groups of machines are in synchronism, the vector that represents the total voltage has an angle the mean value of which remains substantially constant, whereas, at the time of a loss of synchronism, the reference vector has an amplitude and an angle the variations of which depend upon the number of machines that are out of step, so that there is then no question of synchronizing generator C by means of said voltage U.

We then discontinue the synchronizing of generator G by cutting said means out of circuit, as soon as one-third of the machines or groups of machines, for instance, are out of step. The voltages given by the auxiliary alternators are compared to those given by generator G, which at this time has an arbitrary voltage and angle.

The above set forth lamp control system might as well be constituted by means of rotary commutators or of any other combination, or electronic tubes or thyratrons.

The devices which have been described are particularly well adapted to the case in which the machines the state of synchronism of which is to be controlled are located close to each other, which is the case of the alternators of a generator plant. However there is no obstacle to the utilization of these devices in the case of machines remote from one another; it then suffices to transmit to a common point, where the phase and frequency comparisons will take place, the voltage produced by the various auxiliary generators, which can be done, either directly by making use of pilot wires, or by modulation through methods that are known in themselves by means of these voltages carrier waves themselves transmitted either through pilot wires or through high voltage energy transmission lines.

However, in the case of a network including multiple machines in synchronism, transmission to a common point of the voltages of all the auxiliary alternators would require a very important number of connections by means of wires or of carrier waves, and, on the other hand, the two by two comparison of all the voltages would call for a considerable number of comparator devices and would lead to a great complication of the luminous signalling system. If $m$ is the number of machines, the number of comparator devices is in fact, $$\frac{m(m-1)}{2}$$

and the number of signalling lamps is $$\frac{m(m+1)}{2}$$

in the case of the devices of Figs. 11 and 12.

In order to obviate this drawback, the invention further includes an arrangement according to which a certain number of machines from which it can be expected that they will maintain synchronism between them, with the exception of exceptional cases, is replaced by an equivalent fictive machine. Such is generally the case of the machines belonging to the same station, or to two or more adjacent stations.

For this purpose, we make the sum of the voltages $u_1$, $u_2$, $u_3$ ... supplied by the auxiliary alternators of the various machines which constitute the group that is considered and we thus obtain a resultant voltage $u$ the phase of which constitutes so to speak the mean of the phases of the various machines, as shown by the vectorial diagram of Fig. 14. It is of interest, in this case, to reduce the virtual value of voltage $u$ to a value close to that of the voltages $u_1$, $u_2$ ... of each machine in such manner as to facilitate the operation of the comparator devices.

Figure 15:
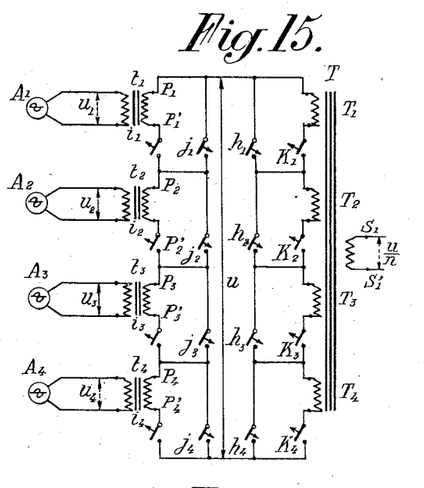
Fig. 15 shows a portion of the apparatus for detecting breaks of synchronism between two groups of machines, according to the feature illustrated by diagram 14.

Various methods can be imagined for obtaining the summing up of the voltages and the reduction of the resultant voltage to a virtual value close to that of the component voltages. We might merely connect in series the armatures of the auxiliary alternators; but such an arrangement is not workable when the circuits fed by the alternators must be independent or when they are already associated in a different manner, for instance for the feed of phase or frequency comparators, as in the case of Figs. 2 and 8. It is then necessary electrically to insulate the auxiliary alternator armatures, which can be done, as shown by Fig. 15, by means of auxiliary transformers $t_1$, $t_2$, $t_3$, $t_4$ of a ratio equal to one, the primaries of which are respectively connected to the terminals of the auxiliary alternators and the secondaries of which are mounted in series.

The voltage $u$ collected across the end terminals $P_1$, $P'_4$ is applied to the primary of a transformer $T$ the transformation ratio of which is equal to the number of machines, four in the case illustrated by the figure, but the primary of which is divided into as many equal sections as there are machines. Switches controlled all together, such as $i_1$, $j_1$, $h_1$, $k_1$, permit of simultaneously bringing out of action the secondary of one of the transformers $t$ and the corresponding section of the primary of transformer $T$ when the corresponding machine is stopped or is not coupled with the others. In this case, switches $i$, $k$ are opened and switches $j$, $h$ are closed; it is clear that, in these conditions, the voltage connected across the secondary terminals $S_1$, $S'_1$ of transformer $T$ is still equal to:

$$\frac{u}{n} = \frac{u_1 + u_2}{n}$$

whatever be the number machines in service. Besides the controlling means of switches $i$, $j$, $h$, $k$ may be made rigid with that of the high voltage switch that serves to the coupling of the machine itself, so that the device is always automatically adapted to the situation of the machines with respect to the network.

Figure 16:
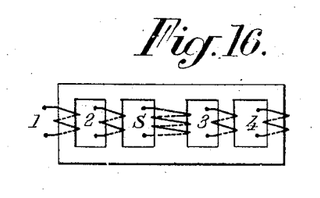
Fig. 16 illustrates a modification of Fig. 15.

A modification of this device consists in providing a single transformer with $(n+1)$ cores, such as shown by Fig. 16. The primary windings 2, 3, 4 are respectively connected with the $n$ auxiliary alternators; the fluxes produced in the corresponding $n$ cores are closed through the central core which carries the secondary winding S. The latter is divided into as many equal sections as there are machines. Switches, not shown on the drawing, controlled all together same as in the case of Fig. 15, permit of simultaneously bringing out of service the primary corresponding to one of the machines and the corresponding section of the secondary. Thus, the voltage collected across the terminals of secondary S is always equal to $$\frac{u_1 + u_2 + \ldots}{n}$$

whatever be the number of machines in service.

Having materialized, through one of these methods, the voltage of the fictive machine equivalent to a group of real machines, this voltage may be transmitted to a distance, through one of the known methods above referred to, to a point where it will be compared, through one of the devices above described as making part of the invention, with the voltages corresponding to other groups of machines.

We may also, having materialized the voltage of the fictive machine equivalent to a group of real machines, transmit it to any of the stations and compare it with the various machines of this station through one of the devices above described. Thus it will be possible, in case of loss of synchronism between the machines of the same station, not only to detect what are the machines that have lost synchronism with respect to one another, but also to know what are those that have remained in synchronism with the major part of the machines of the network.

In all that precedes, it has been assumed that the comparator devices pursuant to the invention served to operate, in case of loss of synchronism, optical signalling means; but it is clear that these devices may also permit of operating either the sectioning of the networks, or revealing of the machines that have got out of step. On the other hand, the optical signalling apparatus might be different from those shown, they might eventually make use of cathode ray oscillographs.

The invention is therefore in no way limited to the embodiments above described, which have been given merely by way of example.

What we claim is:

1. For use in connection with an alternating current network and a plurality of machines connected with said network, an apparatus for disclosing the lead or lag of at least one of said machines with respect to the others which comprises, in combination, means driven directly by the rotors of said machines for producing auxiliary electromotive forces corresponding respectively to their working conditions, means for supplying a reference electromotive force, and means for comparing said auxiliary electromotive forces with said reference electromotive force, respectively, synchronized under normal working conditions with a voltage proportional to the sum of the respective voltages of said machines.

2. For use in connection with an alternating current network and a plurality of machines connected with said network, an apparatus for disclosing the lead or lag of at least one of said machines with respect to the others which comprises, in combination, means driven directly by the rotors of said machines for producing auxiliary electromotive forces corresponding respectively to their working conditions, means for supplying a reference electromotive force, and means for comparing said auxiliary electromotive forces with said reference electromotive force, respectively, synchronized under normal working conditions with a voltage proportional to the sum of the respective voltages of said machines but no longer synchronized as soon as synchronism is broken between said machines.

3. For use in connection with an alternating current network and a plurality of machines connected with said network, an apparatus for disclosing the lead or lag of at least one of said machines with respect to the others which comprises, in combination, means driven directly by the rotors of said machines for producing auxiliary electromotive forces corresponding respectively to their working conditions, means for supplying a reference electromotive force, means for comparing said auxiliary electromotive forces with said reference electromotice force, respectively; a signalling board including a plurality of series of lamps corresponding each to one of said machines, respectively, and means operative by said comparing means for switching on said lamps in a given manner when synchronism is broken.

4. An apparatus for indicating the absence of synchronism between several electric machines of an alternating current net work, in combination means operated by the rotors of said machines to produce electromotive forces corresponding respectively to their operating conditions, means for supplying a reference electromotive force synchronized under normal working conditions with a voltage proportional to the sum of said electromotive forces, means for comparing said respective electromotive forces with said reference electromotive force to supply currents varying with the relative angular positions of the respective rotors, and luminous devices adapted to be influenced respectively and permanently by said currents so as to show at every stage the state of synchronism of the corresponding machines.

5. An apparatus as in claim 4 for $n$ machines in which the luminous devices have a luminous board with $n$ rows and $n$ columns, the lamps of said rows and columns being so controlled that when the synchronism is broken the lamps indicate in each row the machines that are respectively in or out of synchronism.

6. An apparatus as in claim 4 for $n$ machines in which the comparing means are influenced on the one hand by an electromotive force of reference, and on the other hand by each of the electromotive forces furnished by the means acting as a function of the position of the rotors.

7. An apparatus as in claim 4 in which the devices comprise for each machine a series of lamps which are lighted successively when the synchronism is broken in a cadence which is a function of the magnitude of the variation of the speed of the rotors.

FRANÇOIS MICHEL CAHEN.
ANDRÉ CHEVALLIER.
PIERRE MARIE ERNEST HENRIET.

REFERENCES CITED

The following references are of record in the file of this patent:

UNITED STATES PATENTS

| Number | Name | Date |
|---|---|---|
| 649,942 | Michalke | May 22, 1900 |
| 701,886 | Huthsteiner | June 10, 1902 |
| 1,576,189 | Hewlett et al. | Mar. 9, 1926 |
| 2,005,962 | Antranikian | June 25, 1935 |
| 2,013,673 | Sias | Sept. 10, 1935 |
| 2,146,632 | Lamb | Feb. 7, 1939 |
| 2,205,330 | Allen | June 18, 1940 |
| 2,339,612 | Bechberger | Jan. 18, 1944 |
| 2,388,977 | Johnson | Nov. 13, 1945 |
| 2,405,568 | Ferrill, Jr. | Aug. 13, 1946 |

OTHER REFERENCES

Article on page 100, volume 7, of the May 1934 issue of Instruments.